(12) United States Patent
Neuwirth (10) Patent No.: US 9,799,029 B2
(45) Date of Patent: Oct. 24, 2017

(54) SECURELY RECEIVING DATA INPUT AT A COMPUTING DEVICE WITHOUT STORING THE DATA LOCALLY

(71) Applicant: Volker Neuwirth, Eden, UT (US)

(72) Inventor: Volker Neuwirth, Eden, UT (US)

(73) Assignee: Zukunftware, LLC, Eden, UT (US)

( * ) Notice: Subject to any disclaimer, the term of this patent is extended or adjusted under 35 U.S.C. 154(b) by 1171 days.

(21) Appl. No.: 13/731,879

(22) Filed: Dec. 31, 2012

(65) Prior Publication Data

US 2014/0188734 A1 Jul. 3, 2014

(51) Int. Cl.
  G06Q 20/38 (2012.01)
  G06Q 20/40 (2012.01)
  H04L 29/12 (2006.01)
  H04L 29/08 (2006.01)
  G06Q 20/32 (2012.01)

(52) U.S. Cl.
  CPC ......... *G06Q 20/382* (2013.01); *G06Q 20/322* (2013.01); *G06Q 20/409* (2013.01); *H04L 29/08621* (2013.01); *H04L 29/12518* (2013.01)

(58) Field of Classification Search
  CPC ............ G06Q 20/409; H04L 29/08621; H04L 29/12518
  USPC .......................................................... 705/44
  See application file for complete search history.

(56) References Cited

U.S. PATENT DOCUMENTS 6,018,724 A * 1/2000 Arent .................... G06F 21/645
                                                       705/39
6,091,835 A   7/2000 Smithies
6,304,915 B1 10/2001 Nguyen et al.
7,934,098 B1  4/2011 Hahn
2002/0069122 A1* 6/2002 Yun .......................... G06Q 30/06
                                                       705/26.1
2002/0156685 A1 10/2002 Ehrlich et al.
2003/0138135 A1  7/2003 Chung et al.
2004/0267873 A1* 12/2004 Shen ....................... H04L 29/06
                                                       709/200

(Continued)

OTHER PUBLICATIONS

International Search Report for WO/2014/042911 (PCT/US13/57859) dated Mar. 6, 2014.

(Continued)

*Primary Examiner* — Eric T Wong
*Assistant Examiner* — Kevin Poe
(74) *Attorney, Agent, or Firm* — Brian Tucker; Kirton McConkie (57) ABSTRACT

The present invention is generally directed to securely receiving data input at a computing device without storing the data locally. The invention allows an application, such as a mobile app, to receive payment information (e.g. credit card information) directly from a user without requiring the application to comply with the PA DSS or another standard. The application can employ any type of user interface for receiving user input as well as one or more overlaid input fields that receive sensitive payment information. The overlaid input fields can be part of a web page or other interface that can securely submit data to a remote computer system (e.g. a server) where it can be stored, processed, or transmitted in accordance with the PCI DSS. In this way, the sensitive payment information (or another type of information) is not stored, processed, or transmitted by the application on the local device.

18 Claims, 8 Drawing Sheets

(56) References Cited

U.S. PATENT DOCUMENTS

| | | |
|---|---|---|
| 2006/0212407 A1 | 9/2006 | Lyon |
| 2006/0265335 A1* | 11/2006 | Hogan et al. .................. 705/65 |
| 2007/0022053 A1 | 1/2007 | Waserstein et al. |
| 2007/0078797 A1 | 4/2007 | Won |
| 2008/0065546 A1 | 3/2008 | Ramachandran |
| 2010/0030697 A1* | 2/2010 | Goodrich et al. ............. 705/75 |
| 2010/0050249 A1* | 2/2010 | Newman ........................ 726/15 |
| 2010/0145861 A1* | 6/2010 | Law et al. ..................... 705/76 |
| 2011/0093777 A1 | 4/2011 | Dunn |
| 2012/0005038 A1* | 1/2012 | Soman .................. G06Q 20/12 705/26.41 |
| 2012/0011066 A1 | 1/2012 | Telle et al. |
| 2012/0078791 A1 | 3/2012 | Huang et al. |
| 2012/0123924 A1* | 5/2012 | Rose et al. ..................... 705/35 |
| 2012/0150598 A1* | 6/2012 | Griggs ...................... 705/14.16 |
| 2012/0158589 A1* | 6/2012 | Katzin et al. .................. 705/44 |
| 2012/0221470 A1 | 8/2012 | Lyon |
| 2012/0233464 A1* | 9/2012 | Miller et al. ................. 713/168 |
| 2012/0239417 A1* | 9/2012 | Pourfallah ......... G06Q 30/0601 705/2 |
| 2012/0253978 A1 | 10/2012 | Bishop et al. |
| 2012/0311706 A1 | 12/2012 | Newman |
| 2013/0132274 A1 | 5/2013 | Henderson et al. |
| 2013/0275306 A1* | 10/2013 | Ignatchenko ...... G06Q 20/3825 705/44 |
| 2014/0012757 A1 | 1/2014 | Henderson et al. |

OTHER PUBLICATIONS

International Search Report for WO/2014/105702 (PCT/US13/76939) dated Mar. 13, 2014.

International Preliminary Report on Patentability for WO/2014/042911 (PCT/US13/57859) dated Sep. 12, 2014.

* cited by examiner

SECURELY RECEIVING DATA INPUT AT A COMPUTING DEVICE WITHOUT STORING THE DATA LOCALLY

CROSS-REFERENCE TO RELATED APPLICATIONS

Not Applicable

BACKGROUND

The Payment Card Industry Data Security Standard (PCI DSS) defines standards for ensuring the protection of cardholder data in computer transactions. These standards apply to all entities that store, process, or transmit cardholder data. For example, a merchant that accepts or processes payment cards must comply with the PCI DSS. The primary goal of the PCI DSS is to protect cardholder data wherever it is processed, stored, or transmitted.

One portion of the PCI DSS, known as the Payment Application DSS (PA DSS), defines standards for third party payment software applications. For example, the PA DSS would govern an application that receives user input of a credit card number or other payment information on a computing device. The PA DSS requires compliance when cardholder data (e.g. primary account number, cardholder name, expiration date, service code, PIN, magnetic strip data, etc.) is stored, processed, or transmitted by the application.

To comply with the PA DSS, applications that receive, store, or transmit cardholder data must be configured to perform various functions (e.g. encryption) on the cardholder data. Performing these functions requires substantial computing resources. Many computing devices have sufficient resources to adequately support such applications.

However, some computing devices, such as mobile devices, either have limited computing resources or lack other security features that make it much more difficult to provide a PA DSS compliant application on such devices. For example, although many smart phones/apps can be configured to accept payment information in a PA DSS compliant manner, it is difficult, costly, and relatively less secure to do so. For this reason, relatively few mobile applications/platforms are certified as PA DSS compliant.

To address this issue, one workaround is being commonly implemented. Mobile applications such as Square (provided by Square, Inc.) or GoPayment (provided by Intuit, Inc.) use a mobile card reader (which is generally plugged in to the earphone jack) that scans a payment card and encrypts the cardholder data before transmitting it to the mobile phone. Because the cardholder data is encrypted before it is transferred to the phone, and therefore never stored on the phone in an unencrypted format, the application running on the phone does not need to comply with the PA DSS. This approach works, but is often less desirable because it requires a separate card reader and requires that a card be physically scanned.

BRIEF SUMMARY

The present invention extends to systems, methods, and computer program products for securely receiving data input at a computing device without storing the data locally. The invention allows an application, such as a mobile app, to receive payment information (e.g. credit card information) directly from a user without requiring the application to comply with the PA DSS or another standard. The application can employ any type of user interface for receiving user input as well as one or more overlaid input fields that receive sensitive payment information. The overlaid input fields can be part of a web page or other interface that can securely submit data to a remote computer system (e.g. a server) where it can be stored, processed, or transmitted in accordance with the PCI DSS. In this way, the sensitive payment information is not stored, processed, or transmitted by the application on the local device.

In one embodiment, the present invention provides a method for displaying a user interface of an application that includes one or more overlaid fields for receiving user input and transmitting the user input to a server system such that the user input is not stored on a computing device on which the application is executing. A user interface of an application is generated. The user interface is displayed on a computing device and includes overlaid content comprising one or more fields for receiving user input of data to be secured on a server system.

User input is received into the one or more fields of the overlaid content. The user input received into the one or more fields of the overlaid content is transmitted to the server system in a secure manner. A token is then received from the server system. The token identifies the user input. Finally, the token is transmitted to the server system to request that the server system use the user input in a secure manner.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to systems, methods, and computer program products for securely receiving data input at a computing device without storing the data locally. The invention allows an application, such as a mobile app, to receive payment information (e.g. credit card information) directly from a user without requiring the application to comply with the PA DSS or another standard. The application can employ any type of user interface for receiving user input as well as one or more overlaid input fields that receive sensitive payment information. The overlaid input fields can be part of a web page or other interface that can securely submit data to a remote computer system (e.g. a server) where it can be stored, processed, or transmitted in accordance with the PCI DSS. In this way, the sensitive payment information is not stored, processed, or transmitted by the application on the local device.

In one embodiment, the present invention provides a method for displaying a user interface of an application that includes one or more overlaid fields for receiving user input and transmitting the user input to a server system such that the user input is not stored on a computing device on which the application is executing. A user interface of an application is generated. The user interface is displayed on a computing device and includes overlaid content comprising one or more fields for receiving user input of data to be secured on a server system.

User input is received into the one or more fields of the overlaid content. The user input received into the one or more fields of the overlaid content is transmitted to the server system in a secure manner. A token is then received from the server system. The token identifies the user input. Finally, the token is transmitted to the server system to request that the server system use the user input in a secure manner.

Embodiments of the present invention may comprise or utilize a special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In the following description, the present invention will be described primarily using an example of obtaining a signature from a remote user using a touch screen device. However, it is emphasized that the present invention is not limited to obtaining a signature, but can be used to obtain any type of input from a remote user. Further, the description also primarily describes the use of email or text message for sending requests to a client computing device. However, it is also emphasized that any communication format that allows a link to be included in the message content can equally be used as described below.

Figure 1:
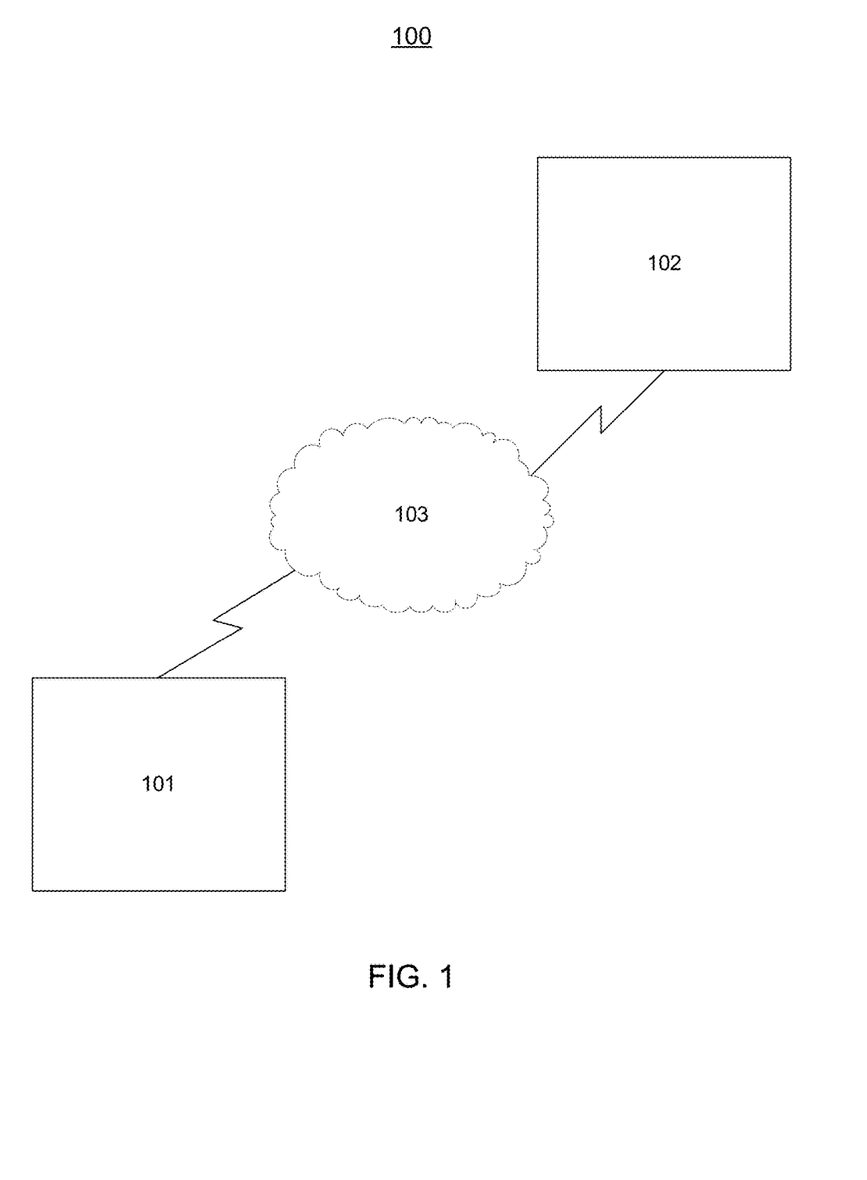
FIG. 1 illustrates an exemplary computer environment in which the present invention can be implemented.

FIG. 1 illustrates an exemplary computer environment 100 in which the present invention can be implemented. Computer environment 100 includes a computing device 101 connected via network 103 to a server system 102. Computing device 101 can represent any type of computing device capable of receiving user input, but in a typical implementation may be a mobile device such as a smart phone. Server system 102 can represent one or more computing devices used to receive data from computing device 101. Server system 102 can comprise one or more server computing devices or a cloud of server computing systems. Network 103 can represent any type of network, but may generally be the internet.

Figure 2:
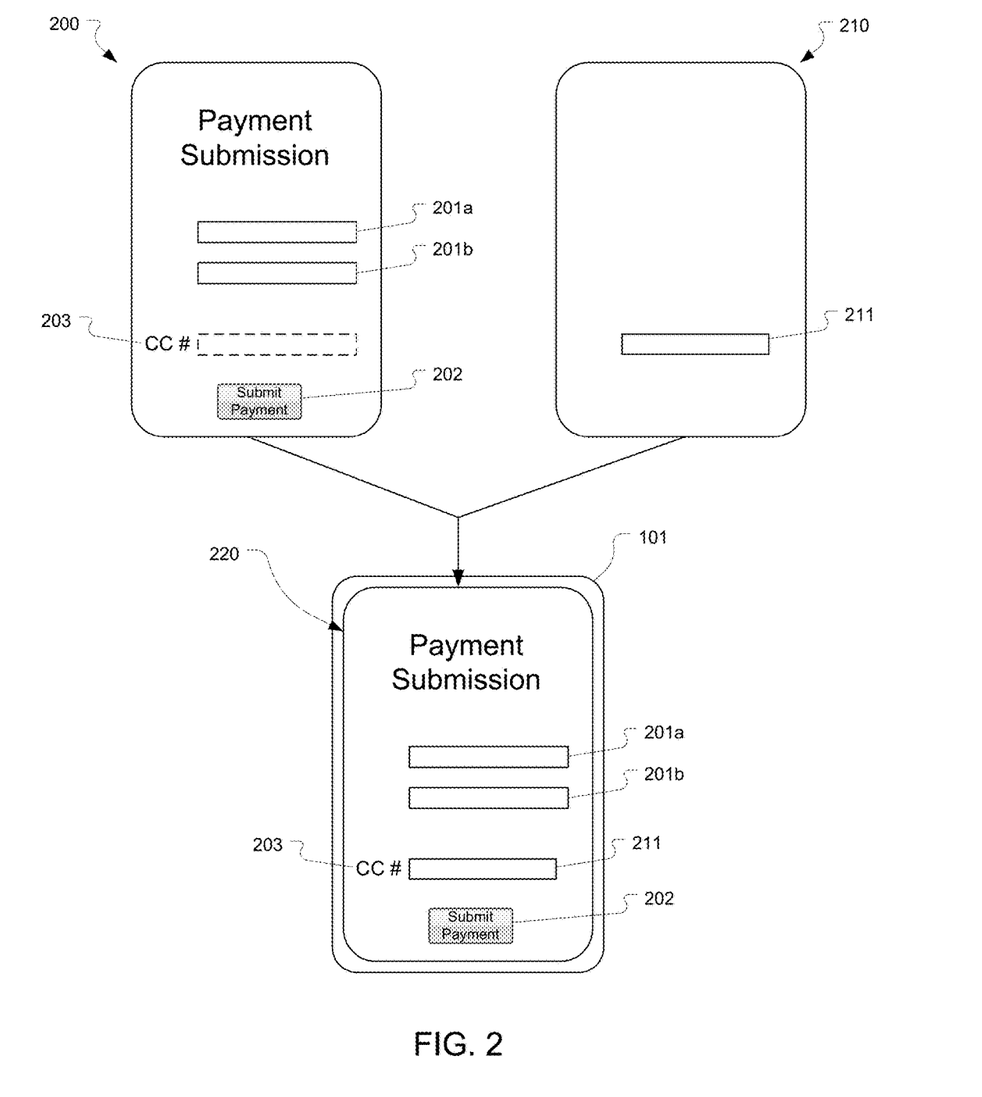
FIG. 2 illustrates how an application can incorporate an overlaid input field for receiving secure input from a user without requiring the secure input to be stored on a computing device.

FIG. 2 illustrates how an application can incorporate an overlaid input field for receiving secure input from a user without requiring the secure input to be stored on computing device 101. A displayed application user interface 220 for receiving input of a user's credit card number is shown. User interface 220 contains a number of fields 201*a*, 201*b*, and 210, text content 203, and submit payment button 202.

User interface 220 is composed of two types of content: typical content 200 and overlaid content 210. The two types of content can be combined in user interface 220 in such a way that the different content is indiscernible to the user.

Typical content 200 includes fields 201a and 201b, text content 203, and submit payment button 202. In contrast, overlaid content 210 includes overlaid field 211 which is used to receive input of a credit card number.

Overlaid content 210 can be in the form of a web page that is displayed overtop of the typical content 200 of the application. As such, when the user inputs data into overlaid field 211, the data is not actually input to the application, but is input to the web page. When the data is input into overlaid field 211, the web page can cause the data to be submitted in a secure manner (e.g. via HTTPS) to server system 102. In this way, the data is never stored on device 101, and the application itself does not store, process, or transmit secure data. For this reason, the application need to comply with the PA DSS, but still provides a secure, seamless interface for receiving sensitive data.

Figure 3:
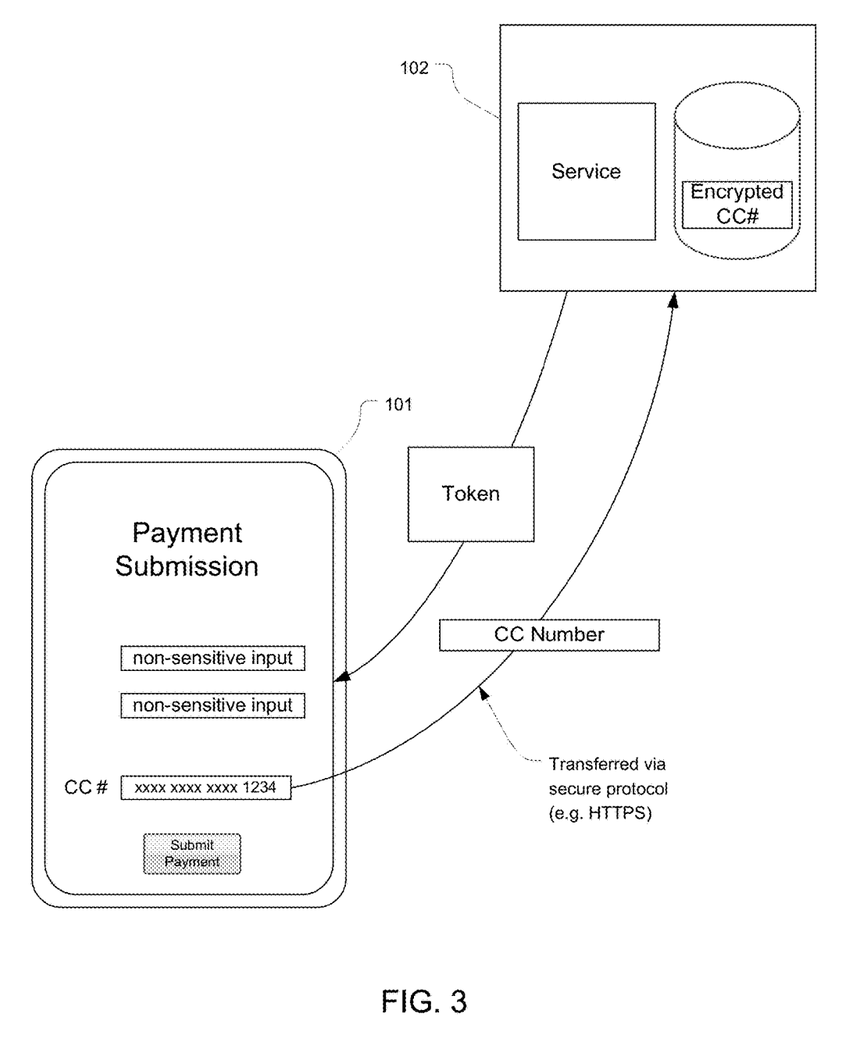
FIGS. 3 and 4 each illustrate various communications between a computing device and a server system when data is input into an overlaid field.

FIG. 3 illustrates various communications between computing device 101 and server system 102 when data is input into overlaid field 211. As shown, a credit card number has been entered into overlaid field 211. In response, the credit card number is transferred to server system 102 in a secure manner. In a typical implementation, the credit card number can be transferred to server system 102 in a similar manner that credit card information is submitted when entered into a web browser (e.g. using HTTPS which is a recommendation for compliance with the PCI DSS).

To enable the application to subsequently use the credit card number, server system 102 can return a token that represents the credit card number submitted to the server. The token can be any type of data that can be used to identify (or recreate on server system 102) the secure information at a later time. As shown, the credit card number is stored in an encrypted format (e.g. to comply with the PCI DSS) on server system 102. A service on server system 102 (e.g. a SOAP service) creates a token that is returned to computing device 101. Computing device 101 can store the token and later submit it back to server system 102 to request use of the credit card number.

In some embodiments, an identifier for the token can also be created and used with the token. For example, the service on server system 102 can generate an identifier (e.g. the last four digits of the credit card number) which can be returned to the computing device 101. The identifier can be maintained to facilitate the use of the token by computing device 101 and/or server system 102. In some cases, the identifier can be created by computing device 101 rather than server system 102.

In some embodiments, the token can be independently meaningless, which means that it will appear as useless data if it were accessed while stored on computing device 101. However, the service on server system 102 can interpret the token within a secure environment to identify the credit card number stored on server system 102. In this way, the token itself has no value to anyone obtaining unauthorized access to it (i.e. the token is not a high-value token).

Further, in some embodiments, to provide greater security, to obtain and use a token, authentication credentials must be provided for a user. For example, in some embodiments, server system 102 will only return a token to device 101 if the user of device 101 has been authenticated (e.g. via username/password) to server system 102. This can be accomplished in various manners such as by requiring the user to log in prior to accessing a user interface that includes overlaid fields. For example, if a mobile application desires to use one or more overlaid fields, the mobile application can be required to submit a user's authentication credentials prior to receiving a webpage containing the overlaid fields.

If authentication succeeds, the mobile application can receive and display the webpage overtop of the application's user interface such that the overlaid fields appear as part of the application's user interface.

Because server system 102 can more easily comply with the PCI DSS, this approach facilitates the creation and use of applications on computing device 101 that do not violate the PA DSS. In other words, the storage, processing, and/or transmission of secure data occurs on server system 102 rather than computing device 101 so that computing device 101 does not need to provide the necessary or desired computing resources or security features to comply with the PA DSS.

Figure 4:
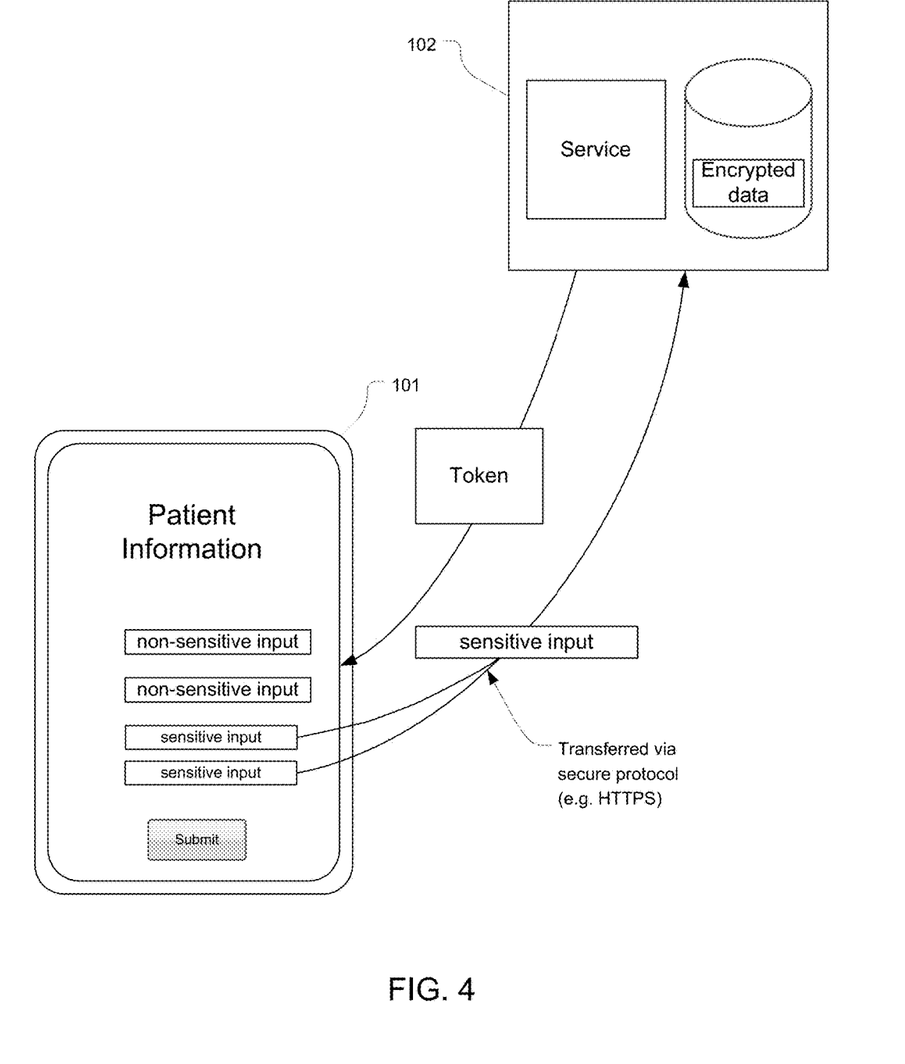

FIG. 4 is similar to FIG. 3 but represents the case where multiple overlaid fields are used to receive multiple sets of secure input. FIG. 4 also represents that the present invention is not limited to receiving payment information, but can be used to securely receive any type of data such as patient information in a health care environment. FIG. 4 shows that a single token is returned when sensitive input from two overlaid fields is submitted. However, depending on the configuration of the service, a token may be created and returned for each field (which may be useful when the input of each field is independently used/referenced).

Figure 5:
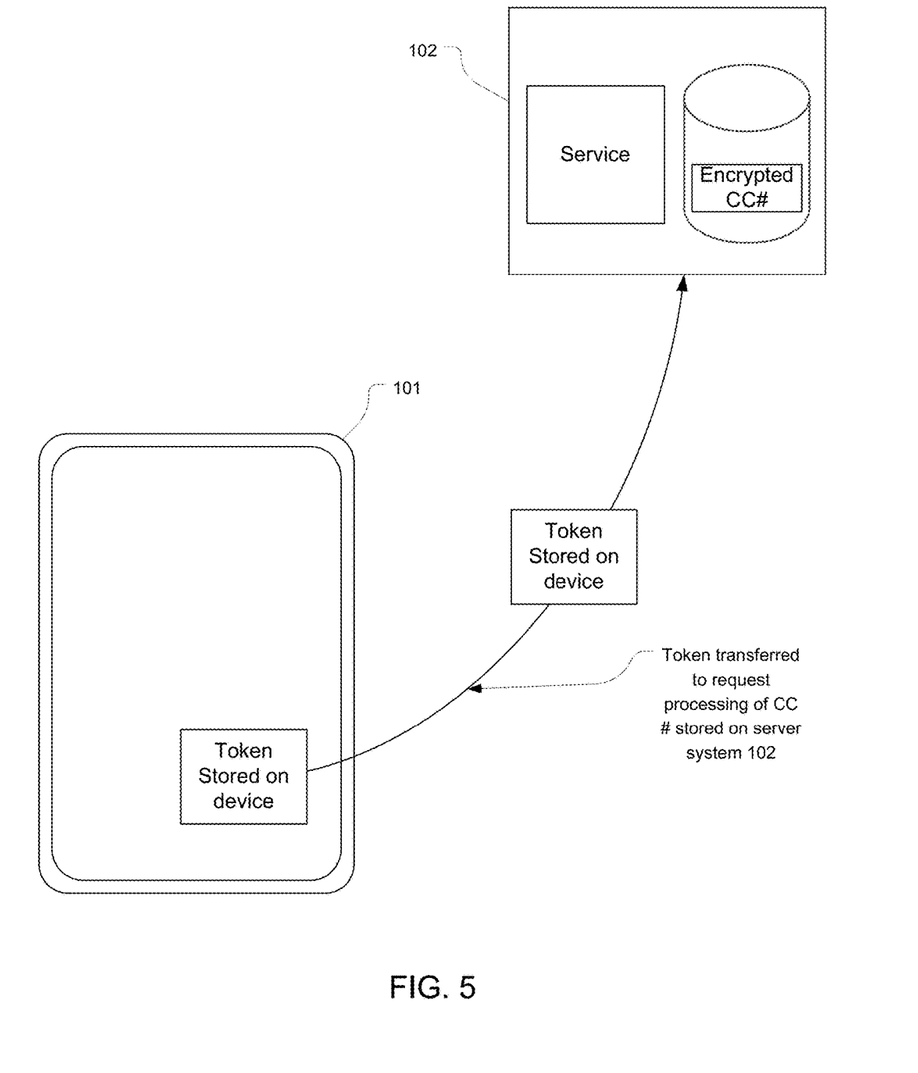
FIG. 5 illustrates how an application on a computing device can use a stored token to request the use of a previously submitted credit card number.

FIG. 5 illustrates how an application on computing device 101 can use a stored token to request the use of the previously submitted credit card number. As shown, the application stores the token locally so that the associated credit card number can be referenced at a later time. The application on computing device 101 submits the token (and possibly an associated identifier as described above) to the service on server system 102.

Figure 6:
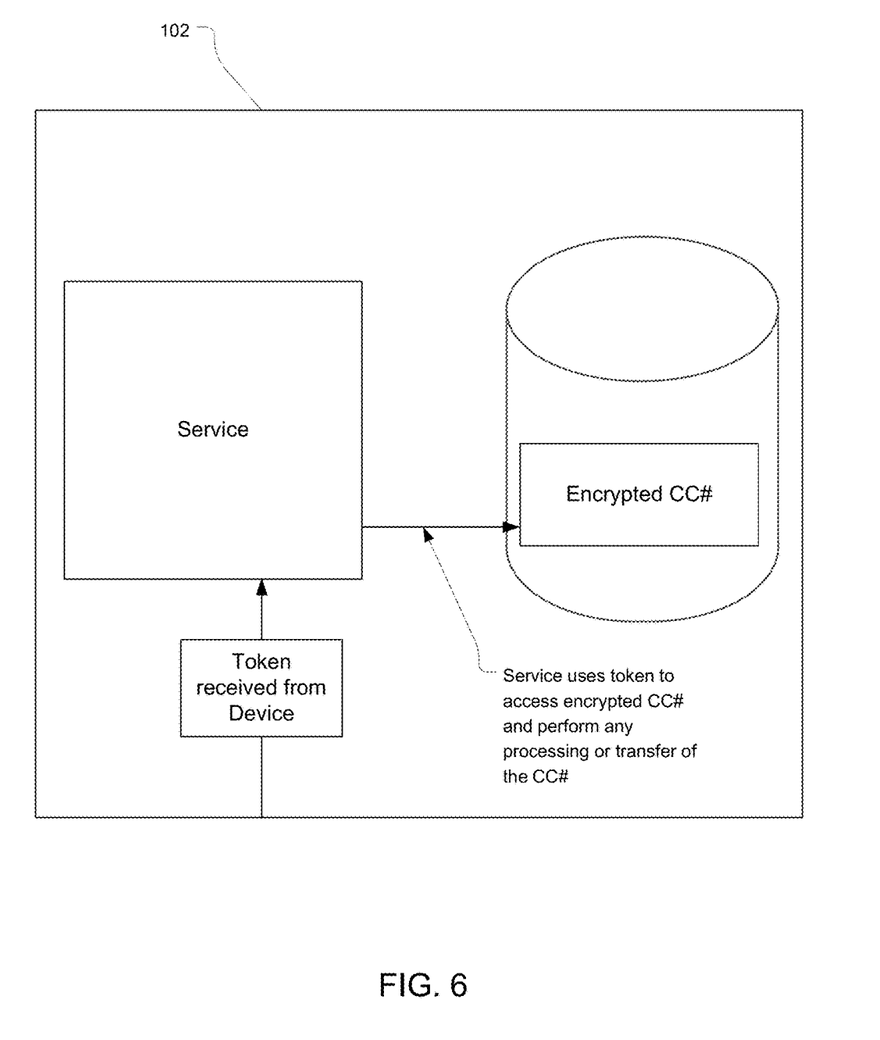
FIG. 6 illustrates how a server system can use a token to access an encrypted credit card number stored on the server system.

As shown in FIG. 6, the service can use the token to access the encrypted credit card number stored on server system 102 and use it as desired. For example, server system 102 can transfer the credit card number to another system, process the credit card number to initiate a charge to the account, etc.

Figure 7:
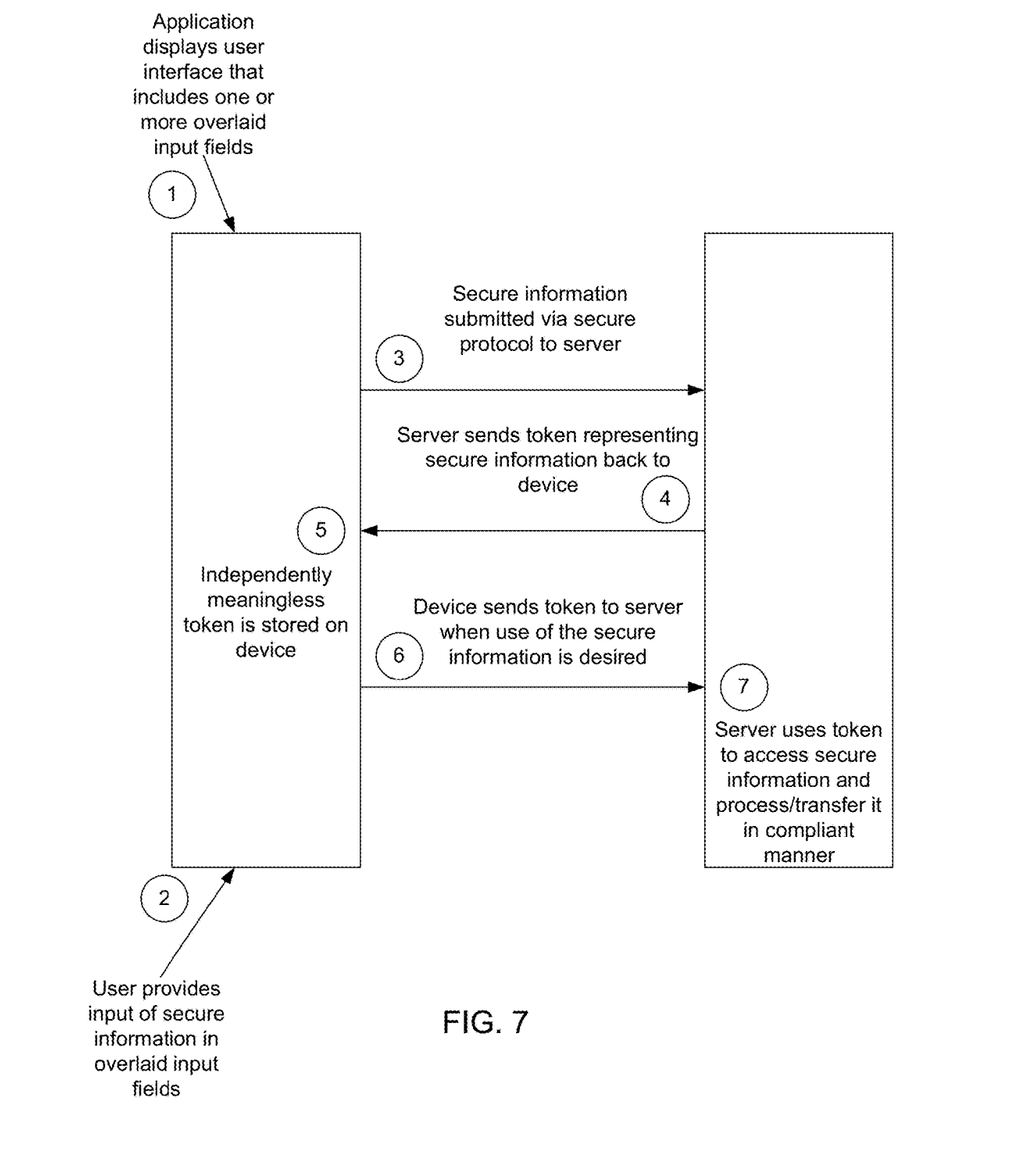
FIG. 7 illustrates a flow diagram that highlights various steps that can be performed when an application employing an overlaid field is used to receive sensitive data from a user.

FIG. 7 provides a flow diagram that highlights various steps that can be performed when an application employing an overlaid field is used to receive sensitive data from a user. In step 1, the application executing on a device displays its user interface that includes one or more overlaid input fields (e.g. in the form of a web page). In step 2, the user provides input into the overlaid fields.

In step 3, the secure data input into the overlaid fields is securely transferred to the server. This can be accomplished using HTTPS or another secure protocol. In step 4, the server sends back a token (or tokens) that represent the secure information. In step 5, the independently meaningless token is stored on the device.

In step 6, the device sends the token to the server requesting that the secure information be used in some manner, such as by requesting that a charge be made to a credit card account associated with a stored credit card number. Finally, in step 7, the server uses the token to identify the secure information and use it in the requested manner.

In some embodiments, the token can be used to auto-populate overlaid fields that are displayed within a user interface on the device or another device. For example, if a user accesses a user interface that employs overlaid fields to request a credit card number, and the device already stores a token representing the user's credit card number, the token can be used (after authentication in some cases) to automatically populate an overlaid input field with the credit card number (or a mask of the credit card number). In other words, the overlaid input fields can be displayed in the same manner as described above, but because the device already stores a token for the requested information, the token can be submitted to the server system and used by the server system to populate the overlaid fields with the necessary information.

Although the above description has used the example of PCI DSS and PA DSS compliance, it is noted that the present invention can be implemented when another or no requirement exists to secure input data. In other words, an application that requests information that is governed by another security standard or that is not governed by any security requirements can still employ the techniques of the invention to secure the information. Examples of other standards for which the present invention can be implemented include the Health Insurance Portability And Accountability Act (HIPAA) standard, the Health Information Technology for Economic and Clinical Health Act (HITECH) standard, and any standard for securing Personally Identifiable Information (PII).

Further, the techniques of the present invention may be more applicable to mobile devices because of their limited resources and lack of security features often provided on personal computers or dedicated computing systems. However, an application on any type of computing device can implement the techniques of the present invention. For example, a desktop application can employ an overlaid field to secure input information in the same manner described.

Figure 8:
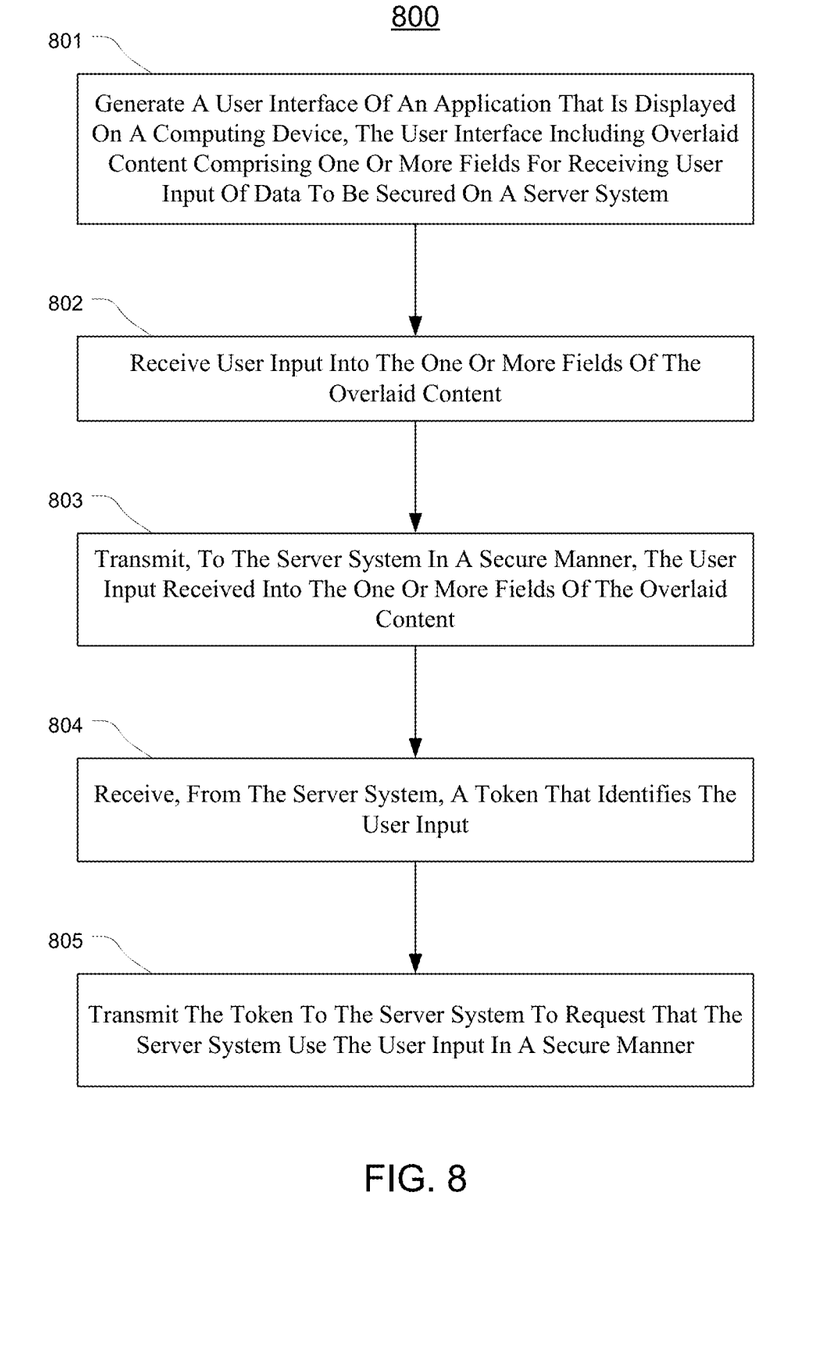
FIG. 8 illustrates a flowchart of an exemplary method for displaying a user interface of an application that includes one or more overlaid fields for receiving user input and transmitting the user input to a server system such that the user input is not stored on a computing device on which the application is executing.

FIG. 8 illustrates a flowchart of an exemplary method 800 for displaying a user interface of an application that includes one or more overlaid fields for receiving user input and transmitting the user input to a server system such that the user input is not stored on a computing device on which the application is executing. Method 800 can be implemented by an application executing on any type of computing device.

Method 800 includes an act 801 of generating a user interface of an application that is displayed on a computing device, the user interface including overlaid content comprising one or more fields for receiving user input of data to be secured on a server system. For example, an application can output a user interface that includes overlaid content such as a web page that contains one or more input fields.

Method 800 includes an act 802 of receiving user input into the one or more fields of the overlaid content. For example, a user's credit card number can be received into the one or more fields of the overlaid content.

Method 800 includes an act 803 of transmitting, to the server system in a secure manner, the user input received into the one or more fields of the overlaid content. For example, the user input can be submitted as a SOAP or other type of request when it is received in the fields of the overlaid content.

Method 800 includes an act 804 of receiving, from the server system, a token that identifies the user input. For example, the application can receive a token from the server system that identifies a submitted credit card number.

Method 800 includes an act 804 of transmitting the token to the server system to request that the server system use the user input in a secure manner. For example, the application can transmit the token to request that a credit card transaction be initiated for an account associated with the credit card number identified by the token.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. One or more computer storage media storing computer executable instructions which when executed on a computing device implement a method comprising:
   generating a first user interface for display on a computing device, the first user interface including one or more fields for receiving user input of non-sensitive information, the first user interface being configured to transmit the non-sensitive information to a first server system;
   generating a second user interface that includes one or more fields for receiving user input of sensitive information, the second user interface being configured to transmit the sensitive information to a second server system via a secure connection;
   displaying the first user interface and overlaying the second user interface on top of the first user interface, overlaying the second user interface causing the one or more fields of the second user interface to be displayed as part of the first user interface;
   while the second user interface is overlaid on top of the first user interface, receiving user input of non-sensitive information into the one or more fields of the first user interface and user input of sensitive information into the one or more fields of the second user interface;
   in response to receiving the user input, causing the non-sensitive information to be transmitted to the first server system and the sensitive information to be transmitted to the second server system via the secure connection such that the non-sensitive information is stored on the first server system and the sensitive information is stored on the second server system in a secure environment;
   receiving, from the second server system, a token that identifies the sensitive information; and
   transmitting the token to the first server system to enable the first server system to use the token in association with the non-sensitive information to perform a transaction requiring the sensitive information such that the first server system can employ the sensitive information without storing the sensitive information.

2. The one or more computer storage media of claim 1, wherein the computing device is a mobile computing device.

3. The one or more computer storage media of claim 1, wherein the first user interface is a first web page and the second user interface is a second web page.

4. The one or more computer storage media of claim 1, wherein the sensitive information is transmitted to the second server system via HTTPS.

5. The one or more computer storage media of claim 1, wherein the sensitive information is payment information.

6. The one or more computer storage media of claim 1, wherein the sensitive information is medical information.

7. The one or more computer storage media of claim 1, wherein the second user interface comprises a web page.

8. The one or more computer storage media of claim 1, further comprising:
   authenticating a user of the computing device prior to displaying the first user interface and overlaying the second user interface on top of the first user interface.

9. The one or more computer storage media of claim 1, wherein the secure environment complies with the Payment Card Industry Data Security Standard (PCI DSS).

10. The one or more computer storage media of claim 1, wherein the one or more fields of the second user interface comprise multiple fields, and wherein receiving a token comprises receiving a token for each of the multiple fields.

11. A method for overlaying a second user interface on top of a first user interface to allow sensitive and non-sensitive information to be stored separately such that the sensitive information is stored in a secure environment without requiring the non-sensitive information to be stored in a secure environment, the method comprising:
   generating a first user interface for display on a computing device, the first user interface including one or more fields for receiving user input of non-sensitive information, the first user interface being configured to transmit the non-sensitive information to a first server system;
   generating a second user interface that includes one or more fields for receiving user input of sensitive information, the second user interface being configured to transmit the sensitive information to a second server system via a secure connection;
   displaying the first user interface and overlaying the second user interface on top of the first user interface, overlaying the second user interface causing the one or more fields of the second user interface to be displayed as part of the first user interface;
   while the second user interface is overlaid on top of the first user interface, receiving user input of non-sensitive information into the one or more fields of the first user interface and user input of sensitive information into the one or more fields of the second user interface;
   in response to receiving the user input, causing the non-sensitive information to be transmitted to the first server system and the sensitive information to be transmitted to the second server system via the secure connection such that the non-sensitive information is stored on the first server system and the sensitive information si stored on the second server system in a secure environment;
   receiving, from the second server system, a token that identifies the sensitive information; and
   transmitting the token to the first server system to enable the first server system to use the token in association with the non-sensitive information to perform a transaction requiring the sensitive information such that the first server system can employ the sensitive information without storing the sensitive information.

12. The method of claim 11, wherein the second user interface comprises a web page.

13. The method of claim 11, wherein transmitting the sensitive information to the second server system comprises submitting a SOAP request to a SOAP service on the second server system.

14. The method of claim 11, wherein the transaction comprises a charge to an account identified by the sensitive information.

15. A method, performed by a first server system, for combining a first user interface for receiving non-sensitive information with a second user interface for receiving sensitive information to enable the non-sensitive information and the sensitive information to be stored separately, the method comprising:
   generating a first user interface for display on a user computing device, the first user interface including one or more fields for receiving user input of non-sensitive information, the first user interface being configured to transmit the non-sensitive information to the first server system;
   generating a second user interface that includes one or more fields for receiving user input of sensitive information, the second user interface being configured to transmit the sensitive information to a second server system via a secure connection;
   causing the first user interface to be displayed on a user computing device and causing the second user interface to be displayed overtop the first user interface such that the one or more fields of the second user interface are displayed to the user as part of the first user interface;
   in response to user input of non-sensitive information into the one or more fields of the first user interface and user input of sensitive information into the one or more fields of the second user interface, receiving, from the user computing device, the non-sensitive information and a token representing the sensitive information, the token being generated by the second server system;
   storing the token in association with the non-sensitive information; and
   transmitting the token to the second server system to request that the second server system initiate a transaction employing the sensitive information.

16. The method of claim 15, wherein at least some of the non-sensitive information is transmitted with the token.

17. The method of claim 15, wherein the sensitive information comprises a credit or debit card number, and the transaction comprises a charge to an account identified by the credit or debit card number.

18. The method of claim 15, wherein the first user interface is a first webpage and the second user interface is a second webpage such that the second webpage is overlaid on top of the first webpage.

* * * * *